Patented Sept. 16, 1952

2,610,964

UNITED STATES PATENT OFFICE 2,610,964

COPOLYMERIZATION OF 1,3-BUTADIENES WITH DIALKYL METHYLENEMALONATES

Roswell H. Ewart, Bloomfield, and Wendell V. Smith, Nutley, N. J., assignors to United States Rubber Company, New York, N. Y., a corporation of New Jersey No Drawing. Application April 14, 1949, Serial No. 87,568

9 Claims. (Cl. 260—78.5)

This invention relates to improvements in the emulsion copolymerization of certain 1,3-butadienes with certain lower alkyl esters of methylenemalonic acid, whereby crystalline, petroleum-oil-insoluble, fiber-forming resins, which are unsaturated, alternating copolymers, are obtained.

It is well known that dialkyl methylenemalonates will react with conjugated dienes to yield solely non-polymeric chemicals of the Diels-Alder adduct type (cf. U. S. Patent 2,313,501). It has also been found that in the presence of a source of free radicals, e. g., a compound or mixture of compounds capable of decomposing to yield free radicals, such as a peroxidic compound, this Diels-Alder addition reaction does not occur to any appreciable extent, but instead, the dialkyl methylenemalonate reacts with the 1,3-butadiene in an entirely different manner to yield an oil-insoluble, unsaturated copolymer containing essentially equimolar quantities of the combined dialkyl methylenemalonate and 1,3-butadiene (see application Serial No. 87,553 of Kenneth W. Doak and Kenneth E. Wilzbach filed concurrently herewith). These copolymers are tough, non-rubbery, fiber-forming plastic substances, and are characterized by a high degree of crystallinity.

The copolymers of the 1,3-butadienes (A), and the methylenemalonic esters (B), employed in this invention, have a chain structure in which the monomer units alternate, thus:

... ABABABABAB ...

and the composition of the copolymers is, over rather wide limits, relatively independent of the composition of the feed. This very strong tendency to alternate in copolymerization is believed to be a unique feature of the monomer pairs employed in this invention, since the monomer pairs employed in ordinary conventional copolymerization processes usually have not shown a tendency to alternate to any such great extent. Thus, in the conventional copolymerization of styrene (S) and methyl methacrylate (M) from a 1:1 molar ratio feed, a copolymer of constant 1:1 composition is obtained, but the units are distributed at random along the chain, for instance, thus:

... SMSSMSMMMSMSSMSMMSSMSM ...

Further, in such conventional copolymerization, if one monomer, say S, is present in excess in the feed, it will also predominate in the copolymer, thus:

... SMSSSMSSMMSSSMSMSSMSSM ...

Suitable methylenemalonic esters for use in the invention are those derived from alkanols of from 1 to 4 carbon atoms, e. g., methanol, ethanol, propanol, isopropanol, butanol, isobutanol, including the halogen substituted alkanols, especially chloroalkanols, e. g., beta-chloroethanol, etc., particularly the symmetrical diesters, e. g., dimethyl, diethyl and dipropyl methylenemalonates, although mixed esters may also be employed.

The 1,3-butadienes employed are those represented by the formula $CH_2=CR-CH=CH_2$, wherein R is one of the radicals hydrogen, chlorine and methyl; namely, 1,3-butadiene, 2-methyl-1,3-butadiene (isoprene), and 2-chloro-1,3-butadiene (chloroprene). The first two of these dienes are especially preferred, since their tendency to form an alternating structure is considerably more marked than is that of 2-chloro-1,3-butadiene.

In contrast to the behavior of the methylenemalonic esters employed in this invention, those methylenemalonic esters derived from alcohols having more than four carbon atoms (e. g., the dihexyl and the di-(2-ethylhexyl) esters), copolymerize very slowly with these 1,3-dienes and give very low molecular weight products. Thus, the di-(2-ethylhexyl) methylenemalonate when copolymerized with butadiene gives a copolymer having an intrinsic viscosity of less than 0.1. Such low molecular weight copolymers are unsuitable for making molded articles or drawn fibers because of their very low tensile strength.

In the copolymerization of the 1,3-dienes and methylenemalonic esters of the classes defined above, the desired alternating structure is obtained even though wide variations in the mole ratio of the 1,3-butadiene to the dialkyl methylenemalonate in the initial reaction mixture are permitted, provided that the polymerization is stopped when essentially all of that monomer which is present in the lower proportion is exhausted. This is not difficult to do, as the speed of reaction is greatly reduced at this point. However, it is preferred to use these monomers in mole ratios in the range from 4:1 to 1:4, and more preferably in essentially equimolar amounts so as to obtain the highest conversion of monomers to the copolymeric form. In the case of 1,3-butadiene or of 2-methyl-1,3-butadiene, the copolymers resulting from these feed ratios, or even from higher or lower ratios, usually contain combined diene and methylenemalonic ester in molar ratio in the range of from 1.4:1 to 1:1.4, when 80% of the monomer present initially in the lower mole fraction is exhausted.

In the case of 2-chloro-1,3-butadiene, the desired alternating structure is most readily obtained with a feed ratio of diene to methylenemalonic ester in the more restricted range from 2:1 to 1:4. The copolymers resulting from these feed ratios usually contain combined 2-chloro-1,3-butadiene and methylenemalonic ester in mole ratio of from 1.5:1 to 1:1.7.

The preferred products consist mainly of the essentially 1:1 mole ratio copolymer, and, because of their substantially uniform composition, optimum physical properties of the products are readily realized. These products are contrasted to the great majority of other copolymers of 1,3-butadienes, which are of non-uniform structure, except for a few cases wherein somewhat uniform structure is obtainable by relative inconvenient and troublesome methods of preparation involving incremental addition of one of the monomers to the reaction mixture.

It has now been found that emulsion polymerization is particularly advantageous as a method of copolymerizing these monomers, because of the unexpectedly rapid reaction, the copolymerization being substantially completed, under proper conditions, in less than one hour at 0° C. The extreme rapidity of this copolymerization reaction is in marked contrast to the slower copolymerization reactions of 1,3-butadiene with other monoolefinic compounds usually encountered.

It is found that the tendency of these copolymers to crystallize is dependent on the temperature of copolymerization, those copolymers prepared at 0° C. crystallizing much more readily than those prepared at 30° or 50° C. Thus, the copolymer of diethyl methylenemalonate with butadiene, when polymerized at 0° C., begins to crystallize in a matter of several hours, while those polymerized at 30° C. require several days to begin to show evidence of crystallization. This increased speed of crystallization which is obtained by low temperature polymerization is a particularly valuable property when making molded articles since the more rapid hardening due to crystallization enables the object to be removed from the mold sooner without distortion.

Another advantage in using fast, low-temperature polymerization is that undesirable side reactions, such as Diels-Alder addition, are suppressed to the extent of virtual elimination. This makes it possible to obtain high yields of the desired copolymer.

According to this invention, the copolymerization is carried out in aqueous emulsion, using an acid-stable emulsifying agent, i. e., an emulsifying agent selected from those classes which are not precipitated in the preferred pH region from 4 to 9. Emulsifying agents of this character, as is well known to those skilled in the art, may be anionic, non-ionic, or cationic.

The anionic emulsifying agents that may be used in this invention include those having the general formula R'—SO₃M, where M represents alkali-metal, ammonium or substituted ammonium (amine) radical, and R' represents an organic radical containing at least one group having more than 8, generally 10 to 20, carbon atoms. Examples of such anionic emulsifying agents are:

(1) Alkyl sulfonates (e. g., dodecyl sodium sulfonate, cetyl potassium sulfonate).

(2) Alkyl sulfates (e. g., sodium dodecyl sulfate, sodium oleyl sulfate).

(3) Sulfonated ethers having long and short chain aliphatic groups (e. g., C₁₇H₃₃—O—C₂H₄—SO₃—Na)

(4) Sulfated ethers having long and short chain aliphatic groups (e. g., C₁₇H₃₃—O—C₂H₄—O—SO₃—Na)

(5) Sulfonated alkyl esters of long chain fatty acids

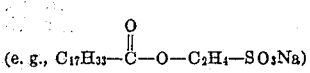

(6) Sulfonated glycol esters of long chain fatty acids

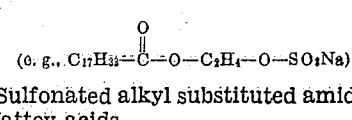

(7) Sulfonated alkyl substituted amides of long chain fatty acids

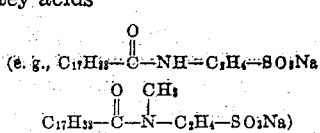

(8) Alkylated arene sulfonates (e. g., isopropylnaphthalene sodium sulfonate, dodecylbenzene sodium sulfonate).

(9) Hydroaromatic sulfonates (e. g., tetrahydronaphthalene sodium sulfonate).

(10) Alkyl sulfosuccinates (e. g., dioctyl sodium sulfosuccinate).

Of the foregoing, classes (2), alkyl sulfates, and (10), alkyl sulfosuccinates, are particularly suitable.

The non-ionic emulsifying agents that may be used include:

(1) Monoethers of polyglycols with long-chain fatty alcohols, such as reaction products of ethylene oxide or polyethylene glycol with a long-chain fatty alcohol (e. g., reaction product of ethylene oxide and oleyl alcohol, viz:

C₁₈H₃₅—(OC₂H₄)ₙOH where n is 10 to 20).

(2) Monoesters of polyglycols with long chain fatty acids, such as reaction products of ethylene oxide or polyethylene glycol with a long chain fatty acid (e. g., reaction product of ethylene oxide or polyethylene glycol with oleic acid, viz:

where n is 10 to 20).

(3) Monoethers of polyglycols with alkylated phenols, such as reaction products of ethylene oxide or polyethylene glycol with an alkyl phenol, usually a lower alkyl (1 to 8 carbon atoms) phenol (e. g., reaction product of ethylene oxide and isopropyl phenol, viz:

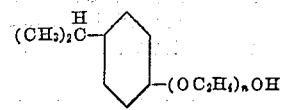

where n is 10 to 20).

(4) Partial esters of polyhydric alcohols with long chain monocarboxylic (fatty and/or resin) acids (e. g., glycerol monostearate, sorbitan trioleate).

(5) Partial and complete esters of long chain monocarboxylic (fatty and/or resin) acids with polyglycol ethers of polyhydric alcohols (e. g., tristearate of polyglycol ether of sorbitan, or so-called polyoxyethylene sorbitan tristearate; hexaoleate of polyglycol ether of sorbitol, or so-called polyoxyethylene sorbitol hexaoleate).

Of the foregoing non-ionic agents, class (3) is particularly suitable.

Cationic emulsifying agents that may be used include:

(1) Quaternary ammonium salts in which one of the groups attached to the nitrogen is an aliphatic group having at least 8 carbon atoms (e. g., cetyl trimethyl ammonium iodide, lauryl pyridinium chloride, benzyl cetyl dimethyl ammonium chloride, N-stearyl betaine).

(2) Amines, amides, diamines and glyoxalidines having an aliphatic group containing at least 8, generally 10 to 20, carbon atoms and their acid salts (e. g., stearylamine hydrochloride, dodecyl amine hydrochloride, oleyl amide, diethylethylene oleyl diamine, mu-heptadecyl-N-hydroxyethylglyoxalidine).

Of the foregoing cationic agents, class (2) including amines such as dodecylamine hydrochloride, is particularly suitable.

In emulsions using the above emulsifying agents, it has been found, unexpectedly, that the copolymerization reaction proceeds at moderate temperatures, e. g., 50° C., even in the absence of any added free-radical polymerization catalyst. However, it is preferred to add to the emulsion 0.01 to 5%, preferably 0.01 to 1%, based on the combined weights of the monomeric materials, of a free-radical polymerization catalyst, usually a water-soluble peroxidic polymerization catalyst, such as potassium peroxysulfate, sodium perborate, etc. From 0.05 to 5%, preferably 0.1 to 3%, of an alkanethiol containing from 4 to 18 carbon atoms, such as tertiary butyl mercaptan, dodecyl mercaptan, etc., is also preferably employed, along with the peroxidic compound. Under these conditions, the emulsion copolymerization is unexpectedly rapid, being substantially completed in less than 30 minutes at 50° C. Higher reaction temperatures, e. g., 70° C., may be employed if desired, but are not generally preferred, because higher temperatures favor the Diels-Alder reaction, thereby decreasing the yield.

It has been found desirable, as indicated previously, in order to obtain maximum yields of polymer and improved polymer properties, to carry out the copolymerization at as low a temperature as possible, i. e., below 30° C., and even below —10° C. Using the formulation described above, containing peroxidic catalyst and alkanethiol, at a reaction temperature of 0° C., practically no polymer is formed in seven hours. It has been discovered, however, that the addition of 0.0001 to 1% (based on the weight of the monomers) preferably 0.0001 to 0.2%, of a salt of a multivalent metal as activator causes an enormous acceleration of the reaction, so that the copolymerization is substantially completed in less than one hour at 0° C. It is preferable (but usually not essential) to use a water-soluble peroxidic catalyst along with the metal salt activator, as well as an alkanethiol. In this formulation, the iron salts are particularly useful, e. g., ferrous sulfate and ferric sulfate, although others, such as cobalt nitrate, may be used. This formulation is particularly useful at temperatures in the range from —5° to +30° C.

It will be understood that when the polymerization is carried out at temperatures below the freezing point of the aqueous emulsion, a suitable antifreeze agent, such as methanol, ethylene glycol, or glycerine, is employed.

At the most preferred low temperatures, i. e., at temperatures of —10° C. or lower, it has been found essential, in order to obtain substantial yields of polymer within a reasonable reaction time, to employ an additional activator, such as 0.005 to 1%, preferably 0.01 to 0.1%, of the cuprous salt of an alkanethiol having from 4 to 18 carbon atoms; for example, cuprous dodecyl mercaptide. This formulation is highly effective at temperatures as low as —20° C., and may also be employed at other temperatures, e. g., —40° C. to +10° C. If desired, the cuprous dodecyl mercaptide may be formed in situ by adding an oil-soluble cuprous salt such as cuprous oleate to the dialkyl methylenemalonate monomer containing an alkanethiol. The speed of the emulsion copolymerization at such low temperatures is particularly surprising in view of the slowness with which the dienes and the malonic esters each homopolymerize under these conditions.

If desired, the polymerization catalyst and/or the alkanethiol may be added in portions as the reaction proceeds.

At the conclusion of the copolymerization the reaction may be short-stopped by a chemical such as hydroquinone, and the latex used as such or the polymer can be isolated by precipitation or preferential extraction, or by evaporation of any solvents or diluents which may be present.

The resulting resinous copolymers are tough plastics which are insoluble in petroleum oils (i. e., aliphatic hydrocarbon mineral oils, such as Pennsylvania crude oil and fractions thereof), but are soluble in a variety of solvents, e. g., benzene and hot acetone, and in the form of such solutions they may be employed in coating and impregnating compositions, as well as in the casting of films. Because of their insolubility in oils, these plastic copolymers are particularly useful for production of surface coatings, tubing, gaskets, and other articles which are to be used in contact with lubricating oils and the like, wherein resistance to the swelling or solvent action of petroleum oil is required. The physical properties, e. g., flexibility and softening point, of the copolymers vary with the choice of the specific monomeric reactants. In many cases desirable variations in the properties of the products may be obtained by employing in the monomer charge, in place of a single methylenemalonic ester and a single diene, a mixture of methylenemalonic esters (usually two such esters) and/or a mixture of dienes of the classes defined previously (usually two such dienes). Hence, numerous and advantageous modifications in the properties of the products can be readily achieved to meet the requirements of various commercial applications.

The copolymers, particularly the higher melting ones, may be formed into filaments which are of particular interest because they crystallize readily, and they are capable of being cold-drawn, whereby their original length can be substantially increased and higher tensile strength attained.

The utility of the copolymers is further increased by their residual unsaturation, which permits them to undergo various polymerization or cross-linking reactions, whereby the copolymers are transformed to solvent-resistant products.

The copolymers are non-rubbery materials, generally having a reversible extensibility of less than 50% at room temperature, that is, they do not retract forcibly to their original length after being extended more than 50%. In common with other crystalline polymers such as balata, nylon and high melting polyesters, below their melting points, these materials will cold-draw when a tensile force exceeding a critical value is applied thereto. Under suitable conditions, the whole sample may be drawn to about 8 to 12 times its original length. In this oriental filamentary form the material has a permanent elasticity enabling it to be stretched 20 to 100 per cent. Such a fibrous material has a field of application which is different from that of rubbery materials, because of its different properties, viz.: (1) very high modulus of elasticity (about 10 times that of a rubber-carbon black stock); (2) low elongation at break (usually less than 100 per cent); and (3) the fact that the oriented fiber will shrink or retract to a small per cent of its drawn length if heated near the melting point of the polymer.

That these copolymers are of highly alternating structure is indicated by the extremely well-defined X-ray powder and spot patterns obtained with the unoriented polymers. These patterns are very different from those obtained with polybutadiene or with polymerized methylenemalonates.

The following examples disclose the invention in more detail.

EXAMPLE 1

A mixture of 3.50 g. of diethyl methylenemalonate, 1.50 g. of 1,3-butadiene (mole ratio 1:1.4) and 0.05 ml. of dodecyl mercaptan at 0° C. are added to 10 ml. of an aqueous solution containing 4.0% by weight of sodium lauryl sulfate and 0.175% of potassium peroxysulfate. Three such emulsions are prepared and held in a 50° C. bath for periods of 5, 10 and 15 minutes respectively. The reaction mixtures are then cooled, and the copolymers are precipitated by the addition of methanol, washed with a methanol-water mixture, and dried at 60° C. to yield 2.7 g., 3.3 g., and 4.1 g. of copolymer, respectively.

Analysis of the 15-minute reaction product:

Found: 63.6% carbon; 8.27% hydrogen; Wijs iodine number, 106.
Theory: (for 1:1 copolymer) 63.7% carbon; 8.02% hydrogen; Wijs iodine number, 112.

EXAMPLE 2

In the manner of Example 1 above, butadiene is copolymerized with various other alkyl methylenemalonates in aqueous emulsion at 50° C. These reactions are summarized below in Table I.

*Table I*

| | Weight of Reactants | | Reaction Time (Hours at 50° C.) | Copolymeric Product | |
|---|---|---|---|---|---|
| | Butadiene | Methylene malonate | | Amount | Melting Point |
| | | | | | °C. |
| a | 9.17 | Diisopropyl ester, 27.2 | 1.5 | 24.0 | |
| b | 1.5 | Di-n-butyl ester, 3.5 [1] | 1.0 | 2.0 | ca. 45. |
| c | 4.3 | Diisobutyl ester, 12.0 | 1.5 | 7.9 | ca. 55. |

[1] 0.05 g. of dodecyl mercaptan added.

EXAMPLE 3

To a mixture of 1.98 g. of diethyl methylenemalonate, 1.95 g. of 1,3-butadiene and 0.02 ml. of dodecyl mercaptan are added 10 ml. of an aqueous solution containing 2.0% by weight of sodium lauryl sulfate and 0.175% of potassium peroxysulfate. The copolymerization is effected by heating the mixture at 30.8° C. for 5 hours, and the product is isolated and purified as in Example 2 to yield 1.93 g. of coplymer, m. ca. 65° C.

One hundred grams of this copolymer are milled with 2.0 g. of stearic acid, 3.0 g. of zinc oxide, 0.7 g. of 2-mercaptobenzothiazole and 1.5 g. of sulfur, and the mixture is heated in a mold for 60 minutes at 142° C., to form a strong, insoluble, cross-linked product.

EXAMPLE 4

To a mixture of 20.8 g. of diethyl methylenemalonate, 8.9 g. of 1,3-butadiene and 0.3 ml. of dodecyl mercaptan are added 60 ml. of an aqueous solution containing 2% of sodium lauryl sulfate and 0.033% of potassium peroxysulfate. The resulting emulsion is cooled to 0° C., and 3 ml. of a 0.14% aqueous solution of ferrous sulfate heptahydrate are added. The reaction begins immediately and the reaction temperature is maintained at ca. 0° C. only by very efficient cooling. The reaction is completed within 50 minutes, and 23 g. of copolymer are obtained from the reaction mixture by the method of Example 2.

EXAMPLE 5

In the manner of Example 4, various 1,3-butadienes and dialkyl-methylenemalonates are copolymerized at 0° C. in aqueous emulsion. The

*Table II*

| Example 5 | Reactants | | Copolymer | | | | |
|---|---|---|---|---|---|---|---|
| | 1,3 Alkadiene | Dialkyl Methylenemalonate | Iodine No. | Intrinsic Viscosity (In Benzene) | $T_g$, Second Order Transition temp. | Melting Point | Crystalline (By X-ray) |
| | | | | | °C. | °C. | |
| a | 1,3-Butadiene | Dimethyl ester | | | 18 | 145–150 | Yes. |
| b | do | Diethyl ester | | 6.3 | −19 | 85 | Yes. |
| b₁ | do | Di-beta-chloroethyl ester | | | | 100 | Yes. |
| c | do | Di-n-propyl ester | | | −20 | 44 | |
| d | do | Diisopropyl ester | 101.2 | 1.64 | −1.5 | 142 | Yes. |
| e | do | Di-n-butyl ester | 92.4 | 3.53 | −26 | 61 | Yes. |
| f | 2-Methyl-1,3-butadiene | Dimethyl ester | | | 29 | 125 | |
| g | do | Diethyl ester | 107.4 | 1.38 | 11 | 100 | Yes. |
| h | do | Di-n-propyl ester | | | −16 | 68 | |
| i | do | Diisopropyl ester | | | 28 | 138 | Yes. |
| j | do | Di-n-butyl ester | | | −25 | 47 | |
| k | 2,3-Dimethyl-1,3-butadiene | Diethyl ester | | 1.18 | 11 | | No. |
| l | do | Diisopropyl ester | | 1.05 | 23 | | No. |
| m | do | Dibutyl ester | | | −20 | | No. | reactant monomers and the properties of the resulting copolymers are summarized in Table II, which also includes the butadiene diethyl methylenemalonate copolymer of Example 4. Examples k, l and m of Table II show that a non-crystalline copolymer is obtained when 2,3-dimethyl-1,3-butadiene is employed. This is in contrast to the crystalline product obtained with 1,3-butadiene, 2-methyl-1,3-butadiene, or 2-chloro-1,3-butadiene.

A film is cast on a glass plate from a benzene solution of the copolymer of 2-methyl-1,3-butadiene and diethyl methylenemalonate (Example 5–g). After the solvent has evaporated, the film is removed from the glass and a strip of this material is cold-drawn to yield a tough, flexible, translucent, moisture-resistant fiber.

EXAMPLE 6

In the manner of Example 4 a copolymer of (A) butadiene and (B) an equimolar mixture of diisopropyl methylene malonate and dibutyl methylene malonate is prepared. This copolymer is crystalline and has a melting point intermediate between that of the butadiene-diisopropyl methylene malonate and the butadiene-dibutyl methylenemalonate copolymers.

EXAMPLE 7

In the manner of Example 4, chloroprene and diisopropyl methylenemalonates are copolymerized at 0°C. in aqueous emulsion. The copolymer has a crystalline X-ray diffraction pattern, and has a melting point of about 150° C. The molar ratio of combined chloroprene to diisopropyl methylenemalonate in the copolymer is substantially 1:1.

EXAMPLE 8

A solution consisting of:

| | G. |
|---|---|
| Sodium salt of sulfonateddioctyl ester of succinic acid | 2.25 |
| Potassium peroxysulfate | 0.03 |
| Water | 58 |
| Methanol | 24.5 | is cooled to −15° C. and 0.435 g. of a suspension of cuprous dodecyl mercaptide in benzene (cuprous dodecyl mercaptide —0.012 g.; dodecyl mercaptan —0.034 g.; and benzene —0.39 g.) is added. To this are then added:

| | G. |
|---|---|
| Diethyl methylenemalonate | 31.5 |
| Butadiene | 13.5 |
| Dodecyl mercaptan | 0.38 |

After emulsification of these, 0.09 ml. of a 10% aqueous solution of ferrous sulfate heptahydrate is added and reaction is continued for 1.5 hours at −15° C., after which the latex is poured into methanol, thus precipitating the polymer. After extracting with hot methanol, then with water, and finally drying, 32 g. of polymer are obtained.

Having thus described our invention, what we claim and desire to protect by Letters Patent is:

1. The process of preparing a fiber-forming, petroleum-oil-insoluble copolymer which comprises copolymerizing in aqueous emulsion a mixture of (A) from one to two 1,3-butadienes of the formula $CH_2=CR-CH=CH_2$, wherein R is selected from the group consisting of hydrogen, chlorine and methyl, (B) from one to two diesters of methylenemalonic acid with an alcohol selected from the group consisting of alkanols and haloalkanols wherein the alkyl and haloalkyl groups have from 1 to 4 carbon atoms, the molar ratio of (A) to (B) being within the range from 1:4 to 4:1, an acid-stable emulsifying agent, and 0.0001 to 1% of a multivalent metal salt activator selected from the group consisting of iron salts and cobalt salts, at a temperature of −50 to +30° C., said percentages being based on the combined weights of the monomeric materials and (A) and (B) being the sole polymerizable monomers.

2. A process as in claim 1, in which the emulsion contains 0.01 to 5% of a water-soluble peroxidic polymerization catalyst.

3. A process as in claim 1, in which the emulsion contains 0.01 to 5% of a water-soluble peroxidic polymerization catalyst and 0.05 to 5% of an alkanethiol containing from 4 to 18 carbon atoms.

4. The process of preparing a fiber-forming, petroleum-oil-insoluble copolymer which comprises copolymerizing in aqueous emulsion a mixture of (A) from one to two 1,3-butadienes of the formula $CH_2=CR-CH=CH_2$, wherein R is selected from the group consisting of hydrogen, chlorine and methyl, (B) from one to two diesters of methylenemalonic acid with an alcohol selected from the group consisting of alkanols and haloalkanols wherein the alkyl and haloalkyl groups have from 1 to 4 carbon atoms, the molar ratio of (A) to (B) being within the range from 1:4 to 4:1, 0.01 to 5% of a water-soluble peroxidic polymerization catalyst, an acid-stable emulsifying agent, 0.05 to 5% of an alkanethiol containing from 4 to 18 carbon atoms, and 0.0001 to 1% of a multivalent metal salt activator selected from the group consisting of iron salts and cobalt salts, and 0.005 to 1% of the cuprous salt of an alkanethiol having from 4 to 18 carbon atoms at a temperature of −40° to +10° C., said percentages being based on the combined weights of the monomeric materials and (A) and (B) being the sole polymerizable monomers.

5. A process as in claim 4 in which the water-soluble peroxidic polymerization catalyst is potassium peroxysulfate and the cuprous alkanethiol is cuprous dodecyl mercaptide.

6. A process as in claim 4 in which (A) is 1,3-butadiene.

7. A process as in claim 4 in which (A) is 1,3-butadiene and (B) is diisopropyl methylenemalonate.

8. A process as in claim 4 in which (A) is 1,3-butadiene and (B) is diethyl methylenemalonate.

9. A process as in claim 4 in which (A) is 1,3-butadiene and (B) is di-beta-chloroethyl methylenemalonate.

ROSWELL H. EWART.
WENDELL V. SMITH.

REFERENCES CITED

The following references are of record in the file of this patent:

UNITED STATES PATENTS

| Number | Name | Date |
|---|---|---|
| 2,136,423 | Fields et al. | Nov. 15, 1938 |
| 2,212,506 | Bachman et al. | Aug. 27, 1940 |
| 2,266,794 | Pannwitz et al. | Dec. 23, 1941 |
| 2,330,033 | D'Alelio | Sept. 21, 1943 |
| 2,457,872 | D'Alelio | Jan. 4, 1949 |
| 2,462,354 | Brubaker et al. | Feb. 22, 1949 |

OTHER REFERENCES

Starkweather et al.: Article in Ind. Eng. Chem., vol. 39, pages 210, 221, February 1947.